(12) United States Patent
Flynn et al.

(10) Patent No.: US 8,831,788 B2
(45) Date of Patent: Sep. 9, 2014

(54) SYSTEMS, METHODS, AND APPARATUS FOR MAINTAINING STABLE CONDITIONS WITHIN A POWER GRID

(75) Inventors: Byron Richard Flynn, Boise, ID (US); Kenneth James Caird, Smyrna, GA (US)

(73) Assignee: General Electric Company, Schenectady, NY (US)

( * ) Notice: Subject to any disclaimer, the term of this patent is extended or adjusted under 35 U.S.C. 154(b) by 203 days.

(21) Appl. No.: 13/090,657

(22) Filed: Apr. 20, 2011

(65) Prior Publication Data

US 2012/0271470 A1    Oct. 25, 2012

(51) Int. Cl.
*G05D 3/12* (2006.01)

(52) U.S. Cl.
USPC ........... 700/292; 700/286; 700/295; 700/297; 705/412

(58) Field of Classification Search
USPC .................................................. 700/297, 292
See application file for complete search history.

(56) References Cited

U.S. PATENT DOCUMENTS

| | | | | |
|---|---|---|---|---|
| 4,409,491 | A * | 10/1983 | Schott | 307/77 |
| 5,912,963 | A * | 6/1999 | Begeja et al. | 379/221.01 |
| 8,294,451 | B2 * | 10/2012 | Hasenfus | 324/72 |
| 2002/0036430 | A1 * | 3/2002 | Welches et al. | 307/18 |
| 2002/0134083 | A1 * | 9/2002 | Staphanos et al. | 60/698 |
| 2004/0051387 | A1 * | 3/2004 | Lasseter et al. | 307/80 |
| 2006/0235574 | A1 | 10/2006 | Lapinski et al. | |
| 2007/0139097 | A1 * | 6/2007 | Yang | 327/530 |
| 2007/0228836 | A1 * | 10/2007 | Teichmann | 307/80 |
| 2010/0145536 | A1 * | 6/2010 | Masters et al. | 700/292 |
| 2011/0210613 | A1 * | 9/2011 | O'Brien et al. | 307/82 |
| 2011/0257956 | A1 * | 10/2011 | Goel et al. | 703/18 |
| 2011/0276192 | A1 | 11/2011 | Ropp | |
| 2011/0295635 | A1 * | 12/2011 | Basak et al. | 705/7.12 |
| 2012/0080942 | A1 * | 4/2012 | Carralero et al. | 307/24 |

FOREIGN PATENT DOCUMENTS

WO    02061911 A1    8/2002

OTHER PUBLICATIONS

European Search Report for Application No. 12164031.2-2210 dated Aug. 22, 2012.

* cited by examiner

*Primary Examiner* — Sean Shechtman
(74) *Attorney, Agent, or Firm* — Sutherland Asbill & Brennan LLP (57) ABSTRACT

Systems, methods, and apparatus for maintaining stable conditions within a power grid are provided. A local device that includes one or more computer processors may identify one or more power sources associated with a structure. The local device may additionally monitor one or more parameters associated with a power grid configured to supply power to the structure. Based at least in part on the monitoring, the local device may identify a power grid fluctuation. Based at least in part on the identification of the power grid fluctuation, the local device may adjust operation of at least one power source included in the one or more identified power sources.

16 Claims, 5 Drawing Sheets

SYSTEMS, METHODS, AND APPARATUS FOR MAINTAINING STABLE CONDITIONS WITHIN A POWER GRID

FIELD OF THE INVENTION

Embodiments of the invention relate generally to power distribution grids, and more specifically to systems, methods, and apparatus for maintaining stable conditions within a power grid.

BACKGROUND OF THE INVENTION

Power distribution networks, such as an electrical power grid, are utilized to deliver electrical power from power supplies to consumers or customers. In conventional power distribution networks, power suppliers typically generate electrical power utilizing power generation plants, and the power suppliers output the generated electrical power onto a distribution grid. Additionally, the power suppliers are required to maintain certain conditions on the power grid. For example, regulatory requirements typically require the power suppliers to maintain certain conditions within the power grid, such as frequency, voltage, and power conditions. In order to maintain these stable grid conditions, power suppliers typically utilize centralized control systems to monitor grid conditions and to attempt to match generated power to consumer demand.

However, the conventional control systems attempt to maintain stable grid conditions at a high level. These control systems typically do not take into consideration grid fluctuations occurring at the consumer level. Additionally, with the increased use of renewable power sources, such as photovoltaic cells and wind turbines, power generation is becoming less centralized. For example, consumers may utilize photovoltaic cells in order to supplement electrical power that is received via the power grid. These distributed power sources are typically not taken into account by conventional control systems; however, power supplied by these distributed power sources may affect power grid conditions at a local level. Accordingly, systems, methods, and apparatus for maintaining stable conditions within a power grid are desirable.

BRIEF DESCRIPTION OF THE INVENTION

Some or all of the above needs and/or problems may be addressed by certain embodiments of the invention. Embodiments of the invention may include systems, methods, and apparatus for maintaining stable conditions within a power grid. According to one embodiment of the invention, there is disclosed a method for maintaining stable conditions within a power grid. A local device that includes one or more computer processors may identify one or more power sources associated with a structure. The local device may additionally monitor one or more parameters associated with a power grid configured to supply power to the structure. Based at least in part on the monitoring, the local device may identify a power grid fluctuation. Based at least in part on the identification of the power grid fluctuation, the local device may adjust operation of at least one power source included in the one or more identified power sources.

According to another embodiment of the invention, there is disclosed a system for maintaining stable conditions within a power grid. The system may include at least one communications interface, at least one measurement device, and at least one processor. The at least one communications interface may be configured to facilitate communication with one or more power sources associated with a structure. The at least one measurement device may be configured to monitor one or more parameters associated with a power grid configured to supply power to the structure. The at least one processor may be configured to (i) identify the one or more power sources, (ii) receive monitoring data from the at least one measurement device, (iii) identify, based at least in part on the received monitoring data, a power grid fluctuation, and (iv) direct, based at least in part on the identification of the power grid fluctuation, operation of at least one power source included in the one or more identified power sources.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

For purposes of this disclosure, the term "structure" refers to any suitable home, residence, apartment, unit, business, building, other location, combination of locations, machine, device, or system that may be connected to a power distribution grid. In operation, a suitable power meter may be provided at the structure in order to monitor an amount of power supplied to the structure by the power distribution grid.

For purposes of this disclosure, the term "power grid fluctuation" refers to any condition that may impact power grid stability. For example, a power grid fluctuation may occur as a result of a power flow variation within the power grid, such as a power flow variation (e.g., a frequency fluctuation, etc.) resulting from power load demand failing to equal or approximately equal power supply.

Disclosed are systems, methods, and apparatus for maintaining stable conditions within a power distribution network. In various embodiments of the invention, distributed management of power generation devices and/or electrical loads may be utilized in order to locally maintain stable grid conditions. In certain embodiments, respective smart agents may be associated with any number of structures or locations that are connected to a power distribution network or power grid. For example, a smart agent may be executed by a smart power meter or a home gateway device associated with a structure. In operation, a smart agent may identify any number of power sources that are available at the structure. For example, the smart agent may identify batteries, power storage devices, wind turbines, and/or photovoltaic cells, panels, and/or arrays. Additionally, as desired, the smart agent may identify any number of electrical loads associated with the structure, such as appliances, lights, etc. In this regard, the smart agent may determine or calculate power generation capabilities and/or power demand associated with the structure.

Additionally, the smart agent may monitor one or more parameters associated with a power grid configured to supply power to the structure. For example, the smart agent may receive measurements data from any number of measurement devices configured to take measurements of various power grid parameters, such as a power grid frequency, a power grid voltage, an amount of power supplied by the power grid, and/or an amount of reactive power associated with the power grid. Based at least in part on the monitoring of the power grid, the smart agent may identify a power grid fluctuation. For example, the smart agent may identify a low frequency or a high frequency grid condition. Based at least in part upon the identification of the power grid fluctuation, the smart agent may adjust operation of any number of power sources and/or electrical loads associated with the structure. For example, the smart agent may direct a power source to provide power to the power grid. As another example, the smart agent may adjust an amount of power supplied to one or more electrical loads. In this regard, the smart agent may contribute to the maintenance of relatively stable conditions within the power grid.

Additionally, as desired in certain embodiments, the smart agent may evaluate one or more pricing parameters, such as a current price associated with power obtained from the power grid. Based at least in part on pricing parameters and/or pricing conditions, the smart agent may optimize the use of power sources associated with the structure. For example, the smart agent may utilize renewable power sources (e.g., wind turbines, photovoltaic cells) during time periods in which power grid power is relatively expensive (e.g., peak load conditions, etc.). Additionally, the smart agent may adjust power supplied to one or more electrical loads based upon an economic analysis. For example, the smart agent may shut off certain electrical loads (e.g., appliances, air conditioners, etc.) during peak conditions. Additionally, as desired, the smart agent may direct a sale of power produced by local power sources to the power grid based upon an economic analysis. For example, if the price of electrical power is relatively high and excess generation capacity and/or stored power exists, the smart agent may direct a sale of power to the power grid.

In certain embodiments, a smart agent may additionally communicate with any number of other smart agents and/or other control systems. For example, the smart agent may communicate with a neighborhood controller and/or with smart agents associated with any number of other structures geographically located near the structure. In this regard, a microgrid or local power grid may be defined and/or managed. For example, a neighborhood grid or community grid may be defined and managed by the smart agents and/or other control systems. As desired, power sources and/or loads may be managed within the microgrid. Additionally, during disconnection events with the main power grid (e.g., power grid failure events), the microgrid may continue to be managed in a power island or disconnected mode. For example, one or more smart agents and/or control systems may collect information associated with power generation capability, stored power, and/or electrical loads. The available power and the power demand may then be locally managed for the microgrid. Additionally, relatively stable conditions may be maintained within the microgrid.

Various embodiments of the invention may include one or more special purpose computers, systems, and/or particular machines that facilitate the maintenance of stable conditions within a power grid. A special purpose computer or particular machine may include a wide variety of different software modules as desired in various embodiments. As explained in greater detail below, in certain embodiments, these various software components may be utilized to monitor power grid conditions and to control any number of local power sources and/or electrical loads based upon the identification of one or more power grid fluctuations.

Certain embodiments of the invention described herein may have the technical effect of maintaining stable conditions within a power grid. For example, distributed controllers and/or smart agents may monitor grid conditions and control the operation of any number of local power sources and/or electrical loads based upon the identification of one or more power grid fluctuation events. In this regard, any number of distributed control devices, such as devices associated with individual structures, may contribute to the maintenance of relatively stable power grid conditions.

Figure 1:
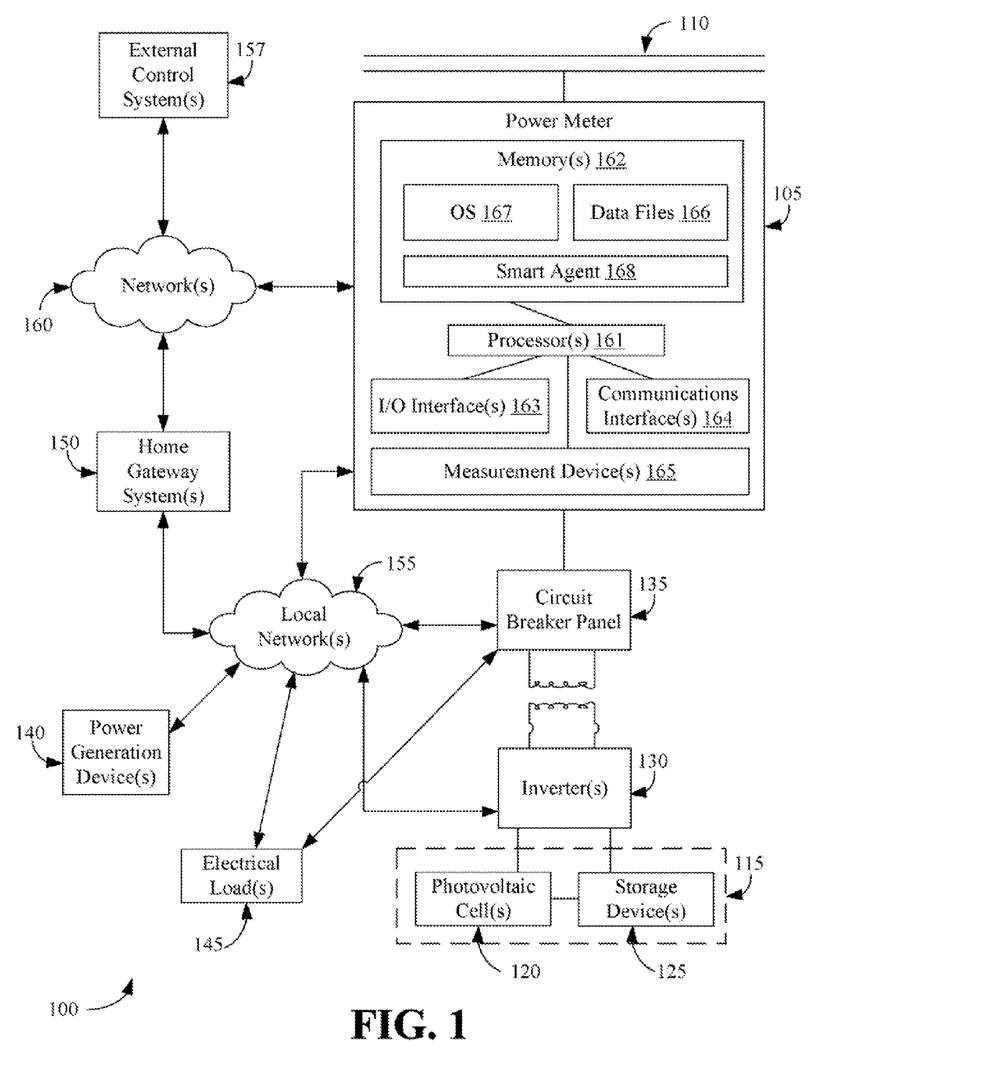
FIG. 1 is a block diagram of one example system that facilitates the maintenance of stable conditions within a power grid, according to an illustrative embodiment of the invention.

FIG. 1 is a block diagram of one example system 100 that facilitates the maintenance of stable conditions within a power grid, according to an illustrative embodiment of the invention. The system 100 illustrated in FIG. 1 may include a power meter 105 that is configured to receive power from a power grid 110 or power distribution network and to supply power to a structure, such as a residence or business. Additionally, the system 100 may include any number of power sources 115, such as photovoltaic cells 120, wind turbines (not shown), and/or power storage devices 125 (e.g., batteries). In certain embodiments, one or more of the power sources 115 may be direct current power sources, and any number of suitable inverters 130 may be provided to facilitate the provision of power to the structure and/or the power grid 110. As desired, a circuit breaker panel 135 or other suitable power distribution device may facilitate collection of power from the power sources 115 and provision of power to the structure and/or to the power meter 105 for output onto the power grid 110. Additionally, as shown, any number of additional power generation devices 140 (e.g., power generators, motors, etc.), such as alternating current devices, and/or electrical loads 145 may be provided and associated with a structure.

In operation, the power meter 105 or a home gateway system 150 may include a suitable smart agent configured to monitor one or more conditions or parameters associated with the power grid 110. Based at least in part upon the monitoring, the smart agent may direct or control operations of other components of the system, such as the power sources 115, the power generation devices 140, and/or the electrical loads 145. In certain embodiments, one or more local networks 155, such as a Home Area Network and/or a MODBUS protocol network, may facilitate communication between various components of the system 100. For example, a local network 155 may facilitate communication between the power meter 105, the power sources 115, a circuit breaker panel 135 (e.g., a smart circuit breaker panel), the power generation devices 140, and/or any number of electrical loads 145. In this regard, the smart agent may collect information associated with local power supply and/or power demand, and the smart agent may utilize at least a portion of the collected information to control system components in order to maintain stable power grid conditions.

The power meter 105 may be any suitable power meter that may be connected to a distribution system or power distribution grid via any number of power lines. For example, the power meter 105 may be a suitable power meter that is connected to the power grid 110. A wide variety of suitable power meters may be utilized as desired in various embodiments, such as a single phase meter or a three-phase meter. The power meter 105 may be configured to measure an amount of electrical energy (e.g., kilowatt hours, etc.) or electrical power that is supplied to an associated structure. In certain embodiments, the power meter 105 may be a smart meter or an advanced meter that is configured to identify consumption in relatively greater detail than a conventional meter. For example, a smart power meter 105 may facilitate real-time or near real-time readings, power outage notification, and/or power quality monitoring. Additionally, as desired, a smart power meter 105 may communicate measurements data, calculations, and/or other information to one or more recipients, such as an external control system 157. Any number of suitable networks 160, such as an Advanced Metering Infrastructure ("AMI") network, a cellular network, and/or the Internet, may facilitate communications between the power meter 105 and the external control system 157.

According to an aspect of the invention, the power meter 105 may additionally monitor one or more conditions associated with the power grid 110 and control the operation of one or more other components of the system 100 (e.g., the power sources 115, the power generation devices 140, the electrical loads 145, etc.) in order to facilitate the maintenance of relatively stable power grid conditions. In doing so, the power meter 105 may be configured to execute any number of suitable software modules that facilitate the provision of grid monitoring services.

The power meter 105 may include any number of suitable computer processing components that facilitate the operation of the power meter, the provision of grid monitoring services, and/or the control of local devices to facilitate the maintenance of stable grid conditions. Examples of suitable processing devices that may be incorporated into the power meter 105 include, but are not limited to, application-specific circuits, microcontrollers, minicomputers, other computing devices, and the like. As such, the power meter 105 may include any number of processors 161 that facilitate the execution of computer-readable instructions. By executing computer-readable instructions, the power meter 105 may include or form a special purpose computer or particular machine that facilitates the provision of grid monitoring and/or maintenance services.

In addition to one or more processor(s) 161, the power meter 105 may include one or more memory devices 162, one or more input/output ("I/O") interfaces 163, one or more communications and/or network interfaces 164, and/or one or more measurement devices 165. The one or more memory devices 162 or memories may include any suitable memory devices, for example, caches, read-only memory devices, random access memory devices, magnetic storage devices, etc. The one or more memory devices 162 may store data, executable instructions, and/or various program modules utilized by the power meter 105, for example, data files 166, an operating system ("OS") 167, and/or a smart agent 168. The data files 166 may include any suitable data that facilitates the operation of the power meter 105 including, but not limited to, information associated with one or more other components of the system 100 (e.g., the power sources 115, the circuit breaker panel 135, the power generation devices 140, the electrical loads 145, etc.), measurements data taken by the power meter 105 and/or the measurement devices 165, one or more parameters associated with acceptable grid conditions, power pricing information, information associated with power generation capability, information associated with power demand and/or expected demand, load profile and/or usage information, and/or status and/or alert information. The OS 167 may include executable instructions and/or program modules that facilitate and/or control the general operation of the power meter 105. Additionally, the OS 167 may facilitate the execution of other software programs and/or program modules by the processors 161, such as the smart agent 168. Although not illustrated, the power meter 105 may include any number of host modules that facilitate communications with any number of external devices and/or other components of the system 100. For example, a host module may facilitate establishment of a communications session with a power source 115 or other component of the system 100. As another example, a host module may facilitate establishment of a communications session with the external control system 157 and/or with any number of other power meters and/or smart agents associated with other structures.

The smart agent 168 may be a suitable software module configured to provide power grid monitoring and/or maintenance services. For example, the smart agent 168 may be a distributed control module that facilitates the maintenance of relatively stable grid conditions. In certain embodiments, the smart agent 168 and/or updates to the smart agent 168 may be downloaded or communicated to the power meter 105 from the external control system 157 via any number of suitable networks 160, such as an AMI network or the Internet. In other embodiments, the smart agent 168 and/or updates to the smart agent 168 may be manually installed on the power meter 105 by a technician or user. For example, a field technician may utilize a portable memory device to install the smart agent 168 onto the power meter 105.

In operation, the smart agent 168 may identify any number of local devices associated with the structure, such as available power sources 115 (e.g., renewable power sources, power storage devices 125, etc.), power generation devices 140, and/or electrical loads 145. Additionally, information associated with the identified devices, such as power generation capacity, stored power information, current load requirements, expected load requirements, and/or load schedules may be obtained. Based at least in part on the obtained information, the smart agent 168 may determine the local power generation resources associated with the structure and/or the present and future power demand associated with the structure. As desired, the smart agent 168 may additionally obtain information that may be utilized to determine or calculate future power generation capability. For example, the smart agent 168 may obtain weather report information (e.g., wind information, temperature information, cloud cover and/or visibility information, etc.), and the smart agent 168 may determine or predict future power generation capability based at least in part on the obtained information.

The smart agent 168 may additionally monitor one or more parameters associated with the power grid 110. For example, the smart agent 168 may continuously or periodically receive measurements data from the measurement devices 165. Based at least in part on the received measurements data, the smart agent 168 may determine and/or calculate one or more power grid parameters, such as a frequency of the power grid 110, a voltage associated with the power grid 110, an amount of power supplied by the power grid 110, and/or an amount of reactive power associated with the power grid 110. Based at least in part on monitoring the one or more power grid parameters, the smart agent 168 may identify or detect a power grid fluctuation. For example, a value of a power grid parameter may be compared to one or more threshold values or ranges of threshold values, and a power grid fluctuation may be identified or detected based at least in part on the comparison. As one example, a power grid fluctuation may be detected based upon a determination that a power grid frequency falls outside of an acceptable range of grid frequencies. A wide variety of different types of power grid fluctuations may be detected as desired in various embodiments.

Once a power grid fluctuation has been detected, the smart agent 168 may adjust or control the operation of one or more other components of the system 100 in order to maintain desirable or stable grid conditions. For example, if it is determined that the power grid frequency is below an acceptable frequency value or range, then the smart agent 168 may determine that the power system load exceeds the power generation. The smart agent 168 may then direct one or more power sources 115 and/or power generation devices 140 to supply power to the power grid 110 in an attempt to return the grid frequency to an acceptable level. Additionally or alternatively, the smart agent 168 may direct the reduction or discontinuation of the supply of power to any number of electrical loads 145. As another example, if it is determined that the power grid frequency is above an acceptable frequency value or range, then the smart agent 168 may determine that the power system generation exceeds the power system load. In response, the smart agent 168 may direct one or more power storage devices 125 to be charged in an attempt to return the grid frequency to an acceptable level. Additionally or alternatively, the smart agent 168 may direct one or more renewable power sources (e.g., wind turbines, photovoltaic cells 120, etc.) to reduce or discontinue the provision of power to the power grid 110. Indeed, a wide variety of control actions may be taken by the smart agent 168 in an attempt to balance power generation and power demand. In this regard, the smart agent 168 may facilitate the maintenance of relatively stable grid conditions.

Additionally, as desired in certain embodiments, the smart agent 168 may evaluate one or more pricing parameters, such as a current price associated with power obtained from the power grid 110. Based at least in part on pricing parameters and/or pricing conditions, the smart agent 168 may attempt to optimize the use of power sources 115 associated with the structure, such as renewable power sources and/or storage devices 125. For example, the smart agent 168 may direct renewable power sources (e.g., wind turbines, photovoltaic cells) to supply power to electrical loads during time periods in which power grid power is relatively expensive (e.g., peak load conditions, etc.). Additionally, the smart agent 168 may adjust power supplied to one or more electrical loads 145 based upon an economic analysis. For example, the smart agent 168 may shut off certain electrical loads (e.g., appliances, air conditioners, etc.) during peak conditions. Additionally, as desired, the smart agent 168 may evaluate pricing conditions and direct a sale of power produced by one or more local, power sources 115 to the power grid 110 based upon an economic analysis. For example, if the price of electrical power is relatively high and excess generation capacity and/or stored power exists, the smart agent 168 may direct or otherwise facilitate a sale of power to the power grid 110. As desired, the economic analysis performed by the smart agent 168 may be performed in addition to the grid maintenance functions. In other words, the effects on grid stability may be taken into account by the smart agent 168 in conjunction with the economic analysis.

In certain embodiments, the smart agent 168 may additionally communicate with any number of other smart agents and/or other control systems. For example, the smart agent 168 may communicate with a neighborhood controller and/or with smart agents associated with any number of other structures geographically located near the structure. In this regard, a microgrid or local power grid may be defined and/or managed. For example, a neighborhood grid or community grid may be defined and managed by the smart agents and/or other control systems. One example of a microgrid is described in greater detail below with reference to FIG. 2. As desired, power sources and/or loads may be managed within the microgrid. Additionally, during disconnection events with the main power grid (e.g., power grid failure events), the microgrid may continue to be managed in a power island or disconnected mode. For example, one or more smart agents and/or control systems may collect information associated with power generation capability, stored power, and/or electrical loads. The available power and the power demand may then be locally managed for the microgrid. Additionally, relatively stable conditions may be maintained within the microgrid.

A few examples of the operations that may be performed by the smart agent 168 are described in greater detail below with reference to FIGS. 3-5.

With continued reference to the power meter 105, the one or more I/O interfaces 163 may facilitate communication with any number of suitable input/output devices, such as one or more physical buttons, a display, a keypad, a control panel, a touch screen display, a remote control, etc., that facilitate user interaction with the power meter 105. In this regard, user commands may be locally received by the power meter 105. Additionally, information may be displayed and/or otherwise output to a user.

The one or more communications or network interfaces 164 may facilitate connection of the power meter 105 to any number of suitable networks, such as the local or home network(s) 155 and one or more network(s) 160 that facilitate communications with devices situated remotely to the structure (e.g., the external control system 157, other power meters, etc.). In this regard, the power meter 105 may receive data from and/or communicate data to other components of the system 100. As desired, the power meter 105 may additionally include any number of network cards and/or network interface devices that facilitate communication with the various networks 155, 160. For example, a ZIGBEE adaptor, a MODBUS adaptor, a radio frequency ("RF") transceiver, a Wi-Fi transceiver, or other suitable device may facilitate connection of the power meter 105 to a local area network or home network 155. Additionally, the power meter 105 may include any number of network cards and/or communications devices, such as an AMI board, a Global System for Mobile Communications ("GSM") transceiver, a General Packet Radio Service ("GPRS") transceiver, a Broadband over Power Line ("BPL") adaptor, and/or an Ethernet card, that facilitate communication with any number of wide area networks 160, such as the Internet, an AMI network, and/or a cellular network.

The one or more measurement devices 165 may include any number of suitable devices configured to take measurements associated with the power grid 110. For example, the one or more measurement devices 165 may be configured to measure and/or monitor any number of parameters associated with the power grid 110, such as the power grid frequency, voltage, power, and/or reactive power. Any number of suitable measurement devices 165 and/or sensors may be utilized as desired in various embodiments of the invention, including but not limited to, voltage sensors, frequency monitors, current sensors, power sensors, volts-amperes reactive ("VAR") sensors, etc. Once measurements data has been collected, the measurements data may be provided to the processors 161 for processing by the smart agent 168. As desired, any number of suitable analog-to-digital conversion devices may be provided in conjunction with the measurement devices 165. In this regard, analog measurements data may be converted into digital data that may be processed by the smart agent 168.

As an alternative to including a smart agent 168 in the power meter 105, any number of home gateway systems 150 may be provided, and a smart agent may be executed by a home gateway system 150. A home gateway system 150 may include any suitable device configured to monitor one or more power grid parameters and to control the operations of the power sources 115 and/or electrical loads 145 in order to maintain relatively stable power grid conditions. Examples of suitable home gateway systems include, but are not limited to, personal computers, home energy management devices, smart power meters, and/or other processor-driven devices. Additionally, the home gateway system 150 may be configured to communicate with the external control system 157, other power meters, and/or other home gateway systems via any number of wide area networks 160 (e.g., an AMI network, the Internet, etc.). For purposes of this disclosure, the grid monitoring and/or management operations described for the power meter 105 may additionally or alternatively be performed by a home gateway system 150.

The power grid 110 may include any number of suitable power lines, power feeders, and/or power distribution networks configured to transport or supply electrical power. As desired, any number of power plants and/or power generators (e.g., gas turbines, steam turbines, geothermal power generating devices, wind turbines, photovoltaic cells, etc.) may be connected to the power grid 110. Additionally, in certain embodiments, any number of conditions (e.g., frequency, voltage, power, reactive power, etc.) associated with the power grid 110 may be regulated in attempts to maintain relatively stable conditions within the power grid 110. According to an aspect of the invention, monitoring and/or maintenance of the power grid may be distributed within a power distribution system. For example, respective smart agents may be associated with any number of structures, and the smart agents may be configured to control local devices in an attempt to maintain relatively stable power grid conditions.

Any number of power sources 115 and/or power generation devices 140 may be associated with a structure in various embodiments of the invention. Examples of suitable power sources 115 and/or power generation devices 140 include, but are not limited to, photovoltaic cells 120 and/or arrays (e.g., solar panels), wind turbines, electrical generators (e.g., gas generators, etc.), and/or any number of power storage devices 125, such as batteries, capacitor banks, etc. Direct current and/or alternating current devices may be utilized as desired. In the event that direct current devices (e.g., photovoltaic cells 120, direct current storage devices, etc.) are utilized, any number of suitable inverters 130 may be utilized to convert a supplied direct current power signal into an alternating current power signal that may be provided to household devices and/or to the power grid 110. Additionally, although separate power sources 115 and power generation devices 140 are illustrated in FIG. 1, for purposes of this disclosure, the term power source may be utilized to refer to any suitable power storage device or power generation device.

With continued reference to FIG. 1, one or more circuit breaker panels 135 may be provided. A circuit breaker panel 135 may include any number of electrical switches that facilitate the communication of electrical power. In certain embodiments, the circuit breaker panel 135 may control the supply of electrical power to any number of electrical loads 145. Additionally, in certain embodiments, the circuit breaker panel 135 may interface with any number of power sources 115 and/or power generation devices 140, and the circuit breaker panel 135 may control the provision of received electrical power to other components of the system 100. As desired, the circuit breaker panel 135 may be a smart circuit breaker panel configured to communicate with the smart agent 168 and/or to control the operation of one or more switches in order to facilitate electrical power distribution within the structure.

In certain embodiments, any number of electrical loads 145 may be provided and associated with a structure. An electrical load 145 may include any device configured to receive a supply of electrical power, such as an electrical appliance, an air conditioner, lights, a security system, etc. In certain embodiments, the electrical loads 145 may be associated with various zones or areas of a structure. For example, security devices (e.g., cameras, motion detectors, etc.) for a particular room may be grouped together. As another example, a plurality of lights associated with a room or group of rooms may be associated with one another. In this regard, the distribution of power within the structure may be controlled for individual areas. Additionally, in certain embodiments, an electrical load 145 may be a relatively smart electrical load configured to communicate with the smart agent 168. For example, the electrical load 145 may include a suitable software module that facilitates interaction with the smart agent 168 (or a smart circuit breaker panel) via a local network 155. In this regard, information associated with operation of the electrical load 145 may be provided to the smart agent 168, and various commands may be received from the smart agent 168. For example, programmed operational schedules may be provided from an air conditioner to the smart agent 168. Additionally, instructions on whether or not to run and/or a thermostat temperature may be provided by the smart agent 168 to the air conditioner.

In certain embodiments, various components of the system 100 may be in communication with one another via any number of local networks 155. For example, the power meter 105, one or more power sources 115, circuit breaker panel 135, one or more power generation devices 140, one or more electrical loads 145, and/or a home gateway system 150 may be in communication with one another via one or more local networks 155. The one or more local networks 155 may include any number of suitable networks that facilitate communication between various components of the system 100 associated with the structure. Examples of suitable local networks 155 include, but are not limited to, a Home Area Network ("HAN"), a ZIGBEE specification wireless personal area network, a radio frequency network, a Bluetooth™ enabled network (trademark owned by BLUETOOTH SIG, INC.), any suitable wireless network, and/or any suitable wired network.

With continued reference to FIG. 1, one or more external control systems 157 may be in communication with the power meter 105 and/or the home gateway system 150 via one or more suitable wide area networks 160. External control systems 157 may include, for example, a central system provided by or associated with a power company or other utility and/or any number of other control systems, such as a neighborhood control system or a substation level control system. As such, an external control system 157 may include any number of processor-driven devices that facilitate the receipt and processing of messages and/or collected data and/or the communication of instructions and/or data. For example, an external control system 157 may include any number of personal computing devices, server computers, and/or other computing devices. A computing device associated with an external control system 157 may include any number of processors, memory devices, and/or communications interfaces. These components may be similar to those described above with reference to the power meter 105. In operation, an external control system 157 may be configured to communicate or download a smart agent (and/or software updates to a smart agent) to the power meter 105 and/or the home gateway system 150. Additionally, in certain embodiments, the external control system 157 may communicate with any number of smart agents in order to facilitate management of the power grid 110. For example, a substation or neighborhood level control system operating in an island mode may collect information associated with power generation and/or power load information for any number of structures. The control system may then attempt to balance the power generation and load requirements in order to maintain relatively stable conditions within a microgrid.

One or more wide area networks 160 may facilitate communication between any number of power meters 105, home gateway systems 150, and/or external control systems 157. A wide variety of suitable wide area networks 160 may be utilized as desired in various embodiments of the invention, such as an AMI network, the Internet, a cellular network, a satellite-based network, or any other suitable wide area network.

As desired, embodiments of the invention may include a system 100 with more or less than the components illustrated in FIG. 1. Additionally, certain components of the system 100 may be combined in various embodiments of the invention. The system 100 of FIG. 1 is provided by way of example only.

Figure 2:
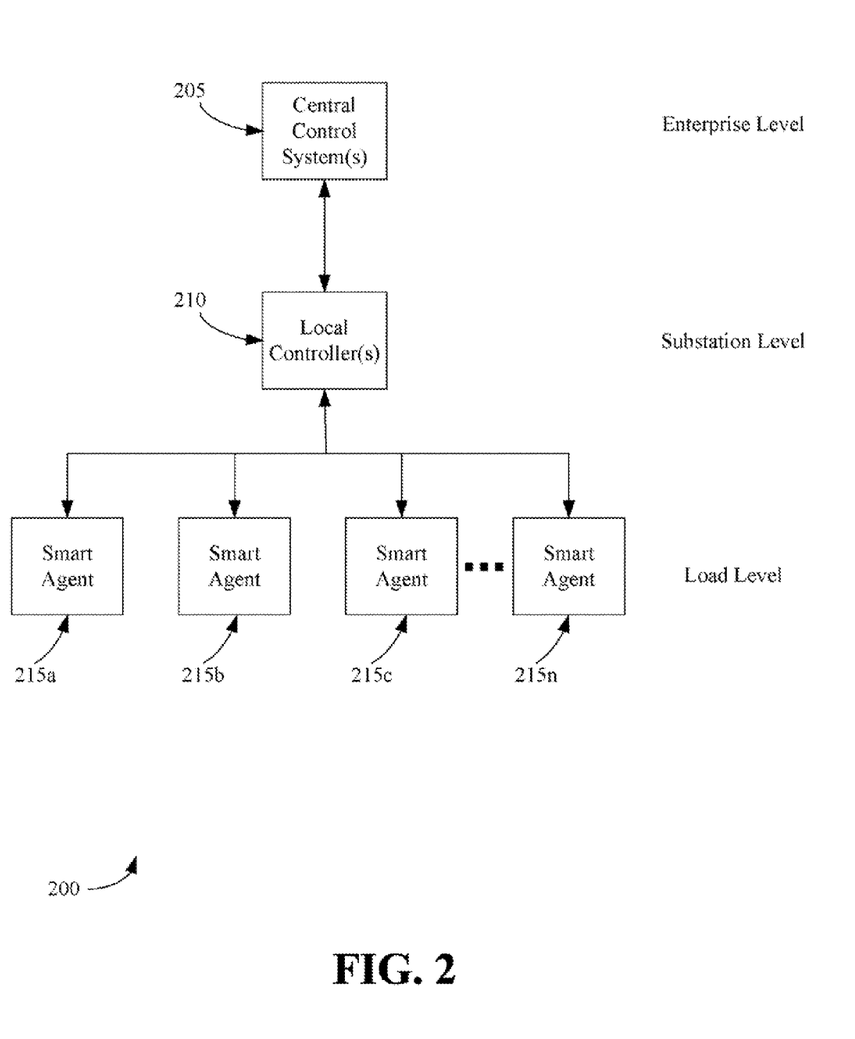
FIG. 2 is a block diagram of an example hierarchy that may be utilized to maintain a power grid in accordance with various embodiments of the invention.

FIG. 2 is a block diagram of an example hierarchy 200 that may be utilized to maintain one or more power grids in accordance with various embodiments of the invention. With reference to FIG. 2, one or more central control systems 205, local controllers 210, and/or smart agents 215a-n may be provided. In certain embodiments, a central control system 205 may be an enterprise level control system. For example, the central control system 205 may be associated with a power service provider. In operation, the central control system 205 may be configured to monitor and/or manage power grid conditions at an enterprise level. For example, the central control system 205 may monitor a power grid and attempt to balance power generation and expected load at a macro level. Additionally, in certain embodiments, the central control system 205 may be configured to download or communicate smart agents 215a-n to any number of customer level devices, such as power meters and/or home gateway systems.

In certain embodiments, one or more local controllers 210 may optionally be provided. A local controller 210 may be, for example, a substation level control system associated with a power distribution substation, a neighborhood, or other particular area. In operation, the local controller 210 may be configured to monitor and/or manage a local power grid or microgrid associated with the local controller 210. For example, the local controller 210 may be configured to monitor a microgrid associated with a neighborhood or other area, and the local controller 210 may attempt to maintain relatively stable conditions within the microgrid. The microgrid may be monitored when the microgrid is connected to a main power grid and/or when the microgrid has become disconnected from the main power grid. For example, the microgrid may be monitored in a power island or disconnected mode in the event of a fault or failure within the main power grid.

In certain embodiments, a local controller 210 may collect information associated with a microgrid, such as information associated with any number of power sources, and/or electrical loads associated with the microgrid. In this regard, the local controller 210 may identify power generation and/or stored power parameters associated with the microgrid. Additionally, the local controller 210 may identify power demand parameters (e.g., current load requirements, expected load demands, load schedules, etc.) associated with any number of electrical loads powered by the microgrid. The local controller 210 may attempt to balance power supply and demand in an attempt to maintain relatively stable conditions within the microgrid. In doing so, the local controller 210 may receive data and/or communicate instructions to any number of individual smart agents 215a-n associated with the microgrid.

With continued reference to FIG. 2, any number of smart agents 215a-n may be provided. Each smart agent 215 may be similar to the smart agent 168 described above with reference to FIG. 1. For example, each smart agent 215 may be associated with a structure and configured to control the operations of power sources and/or electrical loads associated with the structure. In this regard, each smart agent 215 may monitor a power grid (e.g., a main power grid and/or a microgrid) that supplies power to the structure, and the smart agent 215 may identify power grid fluctuations that may affect stability within the power grid. Based upon the identification of a power grid fluctuation, the smart agent 215 may control the operation of any number of devices associated with the structure (e.g., power sources, electrical loads, etc.) in an attempt to maintain relatively stable conditions within the power grid.

Additionally, as an alternative to a local controller 210 directing operations within the microgrid, any number of smart agents 215a-n may communicate with one another in order to maintain the microgrid. As one example, a first smart agent may collect information from other smart agents, and the first smart agent may direct or control power generation and load balancing within the power grid. As another example, control functions for the microgrid may be distributed among any number of the smart agents 215a-n.

Figure 3:
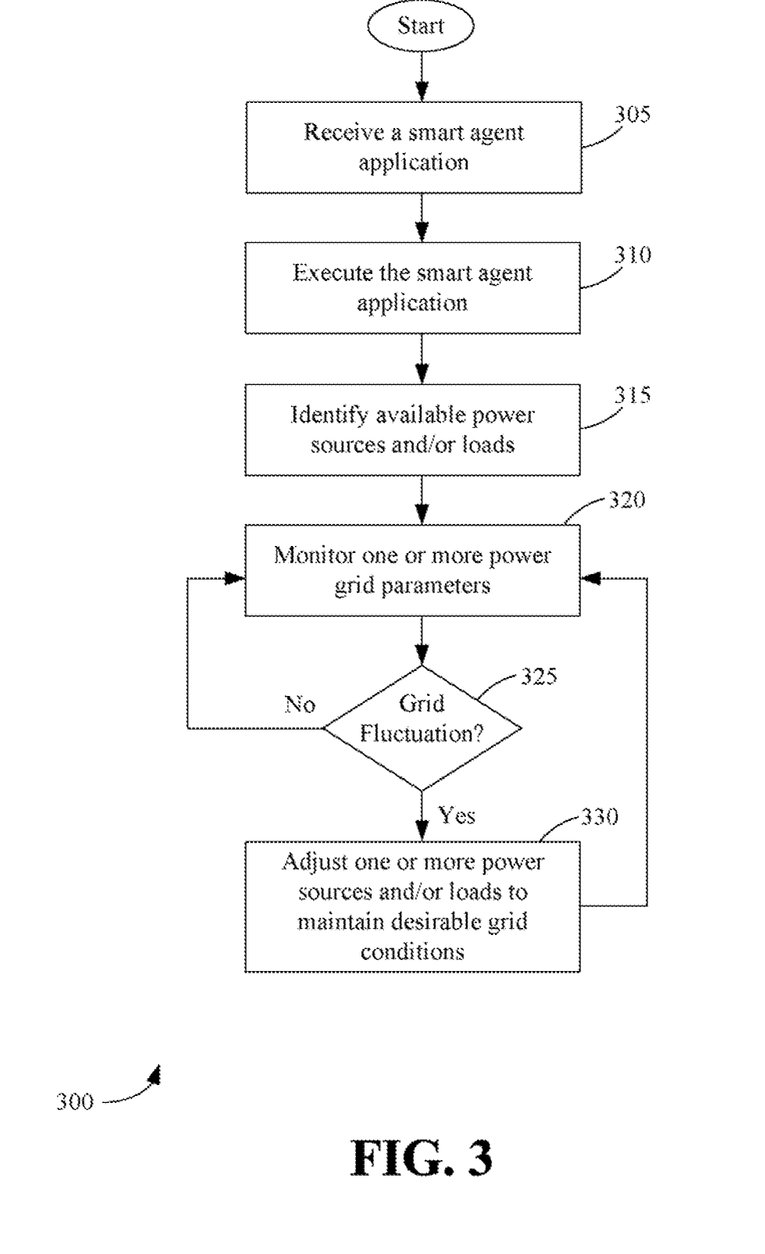
FIG. 3 is a flow diagram of an example method for monitoring a power grid utilizing a smart agent application, according to an illustrative embodiment of the invention.

FIG. 3 is a flow diagram of an example method 300 for monitoring a power grid utilizing a smart agent application, according to an illustrative embodiment of the invention. The method 300 may be utilized in association with one or more power grid management systems, such as the system 100 illustrated in FIG. 1. In certain embodiments, the operations of the method 300 may be performed by a suitable smart agent, such as the smart agent 168 illustrated in FIG. 1.

The method 300 may begin at block 305. At block 305, a smart agent application or smart agent 168 may be received. For example, a smart agent 168 may be received by a power meter or home gateway system from a central control system. As another example, a smart agent 168 may be loaded onto a power meter or home gateway system by a service technician. Once the smart agent 168 has been received at block 305, the smart agent may be executed at block 310.

At block 315, any number of available power sources and/or electrical loads may be identified. For example, the smart agent 168 may receive identification and/or operation information from power sources (e.g., renewable power sources, batteries, etc.) and/or electrical loads via one or more suitable home area networks or local networks. Based at least in part on the received information, the smart agent 168 may identify or determine information associated with available stored power and/or power generation capability for the structure. As desired, the smart agent 168 may obtain a wide variety of information, such as weather information, that may be utilized to determine or estimate future power generation capabilities. For example, the smart agent 168 may estimate the effects of cloud cover, visibility, and/or wind conditions on the power generation capabilities of photovoltaic cells and/or wind turbines.

Additionally, the smart agent 168 may identify or determine information associated with one or more electrical loads. For example, the smart agent 168 may identify one or more electrical loads, such as the electrical loads 145 illustrated in FIG. 1. Additionally, the smart agent 168 may identify power demand for the structure, such as current power demand, scheduled future demand (e.g., programmed air conditioner demand, etc.), demand profiles, and/or historical demand data. In this regard, the smart agent 168 may determine a current demand of one or more electrical loads. Additionally, the smart agent 168 may estimate or predict a future demand of the one or more electrical loads 145.

As desired in certain embodiments, the smart agent 168 may additionally communicate with any number of other smart agents associated with other structures, such as other structures within a same neighborhood. In this regard, the smart agent 168 may identify available power sources and/or electrical loads associated with other structures. For example, power sources and/or electrical loads associated with a microgrid may be identified.

At block 320, one or more parameters associated with a power grid may be monitored. The power grid may be any suitable power grid, such as a relatively large power distribution network or a microgrid, configured to provide electrical power to the structure. Additionally, any number of parameters associated with the power grid may be monitored, such as a frequency of the power grid, a voltage associated with the power grid, a power supplied by the power grid, and/or a reactive power associated with the power grid. As desired, any number of suitable sensors and/or measurement devices may be utilized to take various measurements associated with the power grid, and measurements data may be provided to the smart agent 168.

At block 325, a determination may be made as to whether a power grid fluctuation has occurred. For example, a determination may be made as to whether one or more monitored conditions associated with the power grid (e.g., frequency, power, voltage, reactive voltage, etc.) fails to satisfy one or more threshold values and/or ranges (e.g., an acceptable range of operation). As one example, a frequency of the power grid may be monitored, and a power grid fluctuation may be identified if the monitored power grid frequency falls outside of an acceptable frequency range. If it is determined at block 325 that no power grid fluctuation has occurred, then operations may continue at block 320, and the smart agent 168 may continue to monitor the power grid. If, however, it is determined at block 325 that a power grid fluctuation has occurred, then operations may continue at block 330.

At block 330, the smart agent 168 may adjust, direct, or control the operation of one or more power sources and/or electrical loads in order to maintain desirable and/or stable grid conditions. In other words, the smart agent 168 may take any number of suitable control actions in order to maintain grid stability. As one example, the smart agent 168 may direct one or more power sources (e.g., a renewable power source, a battery, etc.) to supply power to the power grid. As another example, the smart agent 168 may adjust an amount of power supplied to one or more electrical loads and/or an amount of power stored in power storage devices. In certain embodiments, the type of control action that is taken may be based upon a type of identified power grid fluctuation. For example, if a grid frequency is relatively low, the smart agent 168 may direct a supply of power to the grid and/or a reduction of power drawn from the grid. As another example, if a grid frequency is relatively high, the smart agent 168 may increase an amount of power drawn from the grid (e.g., charge power storage devices, etc.) and/or reduce an amount of power supplied to the grid. Indeed, a wide variety of suitable control actions may be taken as desired in various embodiments.

The method 300 of FIG. 3 may optionally end following block 330. Alternatively, as shown, the operations of the method 300 may be continuously performed in a repeating loop.

Figure 4:
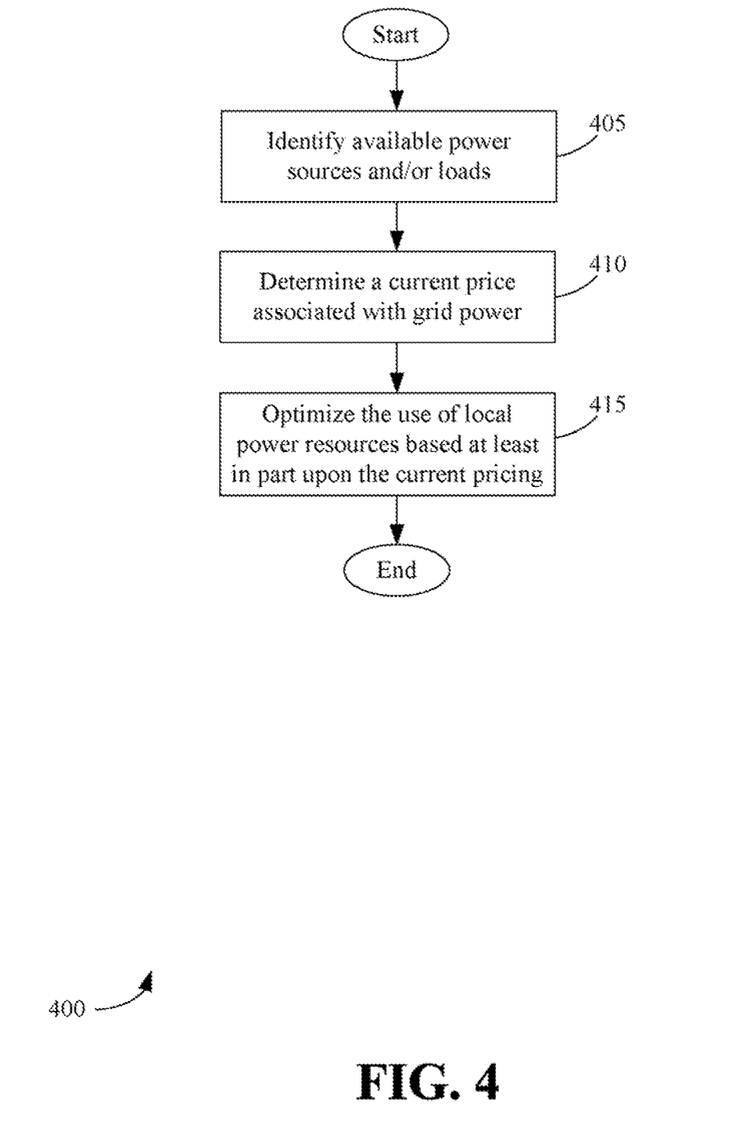
FIG. 4 is a flow diagram of an example method for optimizing power resources during the monitoring of a power grid, according to an illustrative embodiment of the invention.

FIG. 4 is a flow diagram of an example method 400 for optimizing power resources during the monitoring of a power grid, according to an illustrative embodiment of the invention. The method 400 may be utilized in association with one or more power grid management systems, such as the system 100 illustrated in FIG. 1. In certain embodiments, the operations of the method 400 may be performed by a suitable smart agent, such as the smart agent 168 illustrated in FIG. 1. Additionally, in certain embodiments, the method 400 may be performed during situations in which a structure is connected to a main power grid rather than a microgrid operating in an island mode.

The method 400 may begin at block 405. At block 405, any number of available power sources and/or electrical loads may be identified. The identification at block 405 of available power sources and/or electrical loads may be similar to the identification described at block 315 above with reference to FIG. 3.

At block 410, one or more pricing parameters may be determined, such as a current price associated with grid power. In other words, the smart agent 168 may determine a current price associated with drawing power from the power grid and providing the power to one or more electrical loads. Additionally, the smart agent 168 may determine a price associated with selling or providing power from the structure to the power grid. In certain embodiments, the current purchase price may reflect or be utilized to determine a price associated with selling power to the power grid.

At block 415, the smart agent 168 may optimize the use of local power resources based at least in part upon the one or more pricing parameters. In other words, the smart agent 168 may take a cost or price associated with electrical power into consideration during the management of local power sources (e.g., renewable power sources, power storage devices, etc.) and/or electrical loads. A wide variety of different control actions may be taken by the smart agent 168 during the optimization of local power resources. For example, during periods of peak demand, the smart agent 168 may utilize local power sources to provide power to one or more electrical loads. As another example, during periods of peak demand, the smart agent 168 may shut off or adjust the power supplied to various electrical loads in order to reduce incurred charges. For example, an air conditioner thermostat may be adjusted. As yet another example, to the extent that excess power supply is available, the smart agent 168 may direct the sale of locally generated and/or stored power to the power grid. In this regard, the smart agent 168 may optimize energy resources based upon pricing parameters.

The method 400 of FIG. 4 may optionally end following block 415. Alternatively, as desired, the operations of the method 400 may be continuously performed in a repeating loop.

Figure 5:
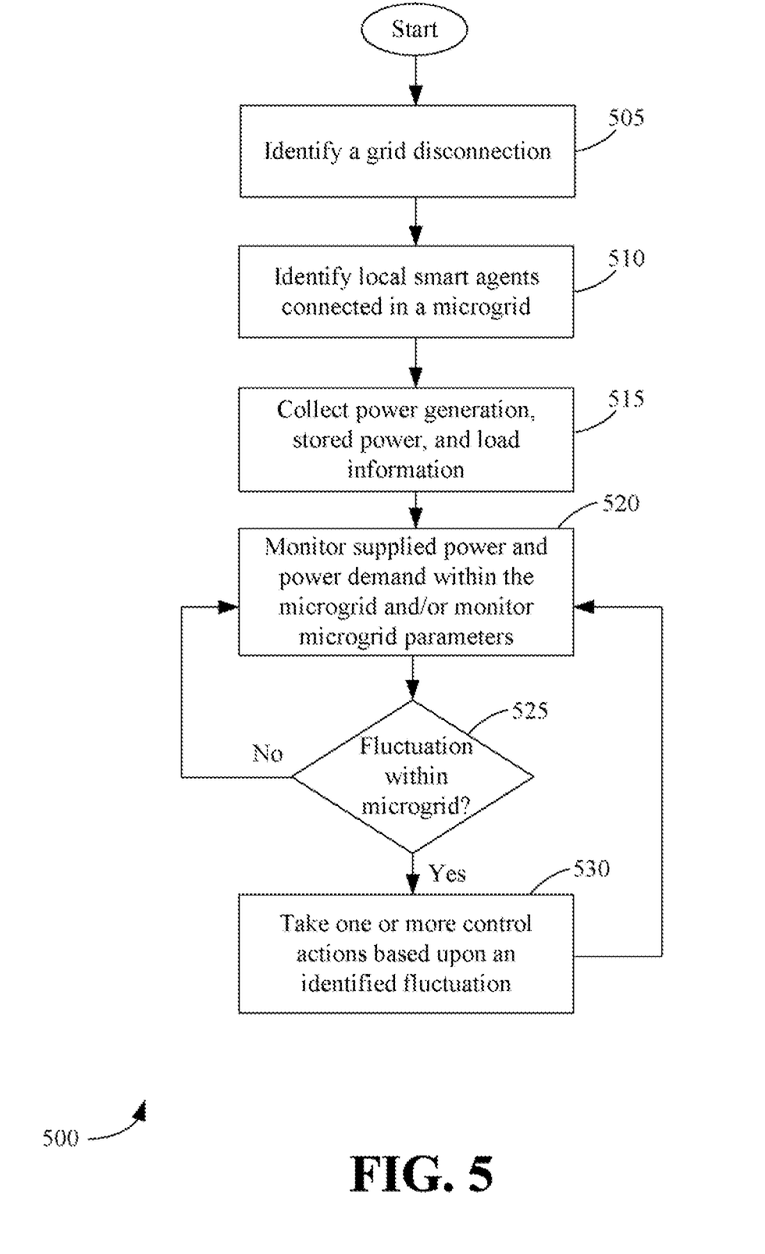
FIG. 5 is a flow diagram of an example method for monitoring a local power grid operating in an island mode, according to an illustrative embodiment of the invention.

FIG. 5 is a flow diagram of an example method 500 for monitoring a local power grid operating in an island mode, according to an illustrative embodiment of the invention. The method 500 may be utilized in association with one or more power grid management systems, such as the system 100 illustrated in FIG. 1. In certain embodiments, the operations of the method 500 may be performed by a suitable smart agent, such as the smart agent 168 illustrated in FIG. 1. Alternatively, the method 500 may be performed by a local controller, such as the controller 210 illustrated in FIG. 2. Additionally, in certain embodiments, the method 500 may be performed during situations in which a structure is connected to a microgrid operating in an island mode or in situations in which the structure is not connected to any power grid.

The method 500 may begin at block 505. At block 505, a grid disconnection event may be identified. For example, a situation in which a structure or group of associated structures (e.g., a neighborhood) has become disconnected from a main power distribution network may be identified. Once a grid disconnection event has been identified, a determination may be made that a structure or microgrid of associated structures will be managed in a disconnected mode or an island mode.

At block 510, one or more local smart agents connected to the microgrid may be identified. For example, any number of smart agents associated with the structures connected to the microgrid may be identified. Communication between the various smart agents (and/or a local controller) may be facilitated via any number of suitable networks, such as an AMI network associated with the microgrid. At block 515, power generation, stored power, and/or electrical load information may be collected. For example, information associated with the power generation capabilities (e.g., renewable resources, power generators, etc.), available stored power (e.g., power stored in batteries and/or other storage devices), and/or electrical load demands (e.g., current demand, future scheduled demand, etc.) may be collected.

At block 520, the supplied power and/or power demand within the microgrid may be monitored. Additionally, any number of parameters associated with the microgrid (e.g., frequency, voltage, power, reactive power, etc.) may be monitored in a similar manner as that described above with reference to block 320 of FIG. 3. At block 525, a determination may be made as to whether a grid fluctuation within the microgrid has been identified. For example, a determination may be made as to whether one or more parameters associated with the microgrid fail to satisfy one or more threshold conditions or ranges. As another example, a determination may be made as to whether the power supply within the microgrid fails to match or approximately match the power demand within the microgrid. If it is determined at block 525 that a fluctuation event has not been identified, then operations may continue at block 520, and the microgrid may continue to be monitored. If, however, it is determined at block 525 that a fluctuation event has been identified, then operations may continue at block 530.

At block 530, any number of control actions may be taken based upon an identified fluctuation within the microgrid. In this regard, an attempt may be made to maintain stable conditions within the microgrid and/or to balance power supply and power demand (i.e., load) within the microgrid. Additionally, a microgrid may be managed during disconnection or emergency periods in which the microgrid has become disconnected from a main power grid. A wide variety of different control actions may be taken as desired in various embodiments of the invention. For example, one or more power sources may be directed to supply additional power to the microgrid or to reduce a supply of power to the microgrid. As another example, power generation devices (e.g., generators, etc.) may be activated or deactivated in order to adjust a power supply to the microgrid. As yet another example, an amount of power supplied to any number of electrical loads may be adjusted. For example, the supply of power to noncritical electrical loads may be reduced or discontinued.

The method 500 of FIG. 5 may optionally end following block 530. Alternatively, as shown, the operations of the method 500 may be continuously performed in a repeating loop.

The operations described and shown in the methods 300, 400, 500 of FIGS. 3-5 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3-5 may be performed. As desired, the operations set forth in one or more of the methods 300, 400, 500, may be performed in a loop as a location is monitored by a smart agent.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising:
   identifying, by a local device comprising one or more computer processors, one or more power sources and one or more electrical loads associated with a structure, wherein the one or more power sources are configured to supply power to the structure and a power grid associated with a power service provider;
   identifying, by the local device, a subset of the one or more electrical loads associated with the structure that are noncritical electrical loads;
   identifying, by the local device, one or more additional power sources associated with a group of one or more related structures geographically near the structure, wherein the one or more additional power sources are customer devices configured to supply power to at least one of the one or more related structures and a neighborhood grid that is connected to the power grid;
   monitoring, by the local device, one or more power grid parameters associated with the power grid and one or more neighborhood grid parameters associated with the neighborhood grid;
   identifying, by the local device, one or more pricing parameters associated with obtaining power from the power grid that comprises at least a current price associated with grid power;
   identifying, by the local device based on the monitoring of the one or more neighborhood grid parameters, one or more neighborhood grid fluctuations;
   identifying, by the local device based on the monitoring of: (i) the one or more power grid parameters and (ii) the one or more neighborhood grid fluctuations, a power grid fluctuation; and
   adjusting, by the local device based on the identification of the one or more pricing parameters and the power grid fluctuation, operation of at least one of the one or more power sources that comprises (i) directing, by the local device when a predefined frequency is identified, a sale of power supplied by at least one of the one or more additional power sources to the power grid and (ii) reducing the supply of power from the one or more power sources to the noncritical electrical loads in order to maintain power grid stability.

2. The method of claim 1, wherein identifying one or more power sources comprises identifying at least one of (i) a photovoltaic cell, (ii) a wind turbine, or (iii) a battery.

3. The method of claim 1, wherein monitoring one or more power grid parameters associated with a power grid comprises monitoring at least one of (i) a frequency parameter, (ii) a voltage parameter, (iii) a power parameter, or (iv) a reactive power parameter.

4. The method of claim 1, wherein identifying a power grid fluctuation comprises determining that a value of at least one of the one or more monitored parameters fails to satisfy at least one threshold value, and wherein adjusting operation of at least one power source comprises adjusting operation of the at least one power source in order to maintain power grid stability.

5. The method of claim 1, wherein adjusting operation of at least one power source comprises supplying power from the at least one power source to the power grid.

6. The method of claim 1, further comprising: adjusting, by the local device based at least in part on the identification of the power grid fluctuation, an amount of power supplied to at least one electrical load associated with the structure.

7. The method of claim 1, further comprising: identifying, by the local device, another local device associated with another structure; and identifying, by the local device based at least in part upon communication with the other local device, one or more additional power sources associated with the other structure; and directing, by the local device based at least in part on the identification of the power grid fluctuation, operation of at least one of the one or more additional power sources.

8. The method of claim 1, further comprising: identifying, by the local device, another local device associated with another structure; determining, by the local device based at least in part upon communication with the other local device, a power supply capability and a power demand associated with a plurality of structures comprising the structure and the other structure; and controlling, by the local device based upon the determined power supply capability and the determined power demand, operation of at least one of (i) the at least one power source, (ii) one or more additional power sources associated with the other structure, (iii) one or more electrical loads associated with the structure, or (iv) one or more electrical loads associated with the other structure.

9. A system, comprising:
   at least one communications interface configured to facilitate communication with (i) one or more power sources and one or more electrical loads associated with a structure and (ii) one or more additional power sources associated with a group of one or more related structures geographically near the structure, wherein the one or more power sources are configured to supply power to the structure and a power grid associated with a power service provider, and wherein the one or more additional power sources are customer devices configured to supply power to at least one of the one or more related structures and a neighborhood grid that is connected to the power grid;
   at least one measurement device configured to monitor one or more power grid parameters associated with the power grid and one or more neighborhood grid parameters associated with the neighborhood grid; and at least one processor configured to (i) identify the one or more power sources, (ii) identify the one or more additional power sources, (iii) identify a subset of the one or more electrical loads associated with the structure that are noncritical electrical loads, (iv) receive monitoring data associated with the one or more power grid parameters and the one or more neighborhood grid parameters from the at least one measurement device, (v) identify one or more pricing parameters associated with power obtained from the power grid, and comprising at least a current price associated with the grid power, (vi) identify, based on the received monitoring data that is associated with the one or more neighborhood grid parameters, one or more neighborhood grid fluctuations, (vii) identify, based on the received monitoring data that is associated with the power grid parameters and the one or more neighborhood grid fluctuations, a power grid fluctuation, and (viii) direct, based on the identification of the one or more pricing parameters and the power grid fluctuation, operation of at least one of the one or more power sources that comprises directing, by the local device when a predefined grid frequency is identified, (i) sale of power supplied by at least one of the one or more additional power sources to the power grid and (ii) reducing the supply of power from the one or more power sources to the noncritical electrical loads in order to maintain power grid stability.

10. The system of claim 9, wherein the system comprises at least one power meter.

11. The system of claim 9, wherein the one or more power sources comprise at least one of (i) a photovoltaic cell, (ii) a wind turbine, or (iii) a battery.

12. The system of claim 11, wherein the one or more power grid parameters associated with a power grid comprise at least one of (i) a frequency parameter, (ii) a voltage parameter, (iii) a power parameter, or (iv) a reactive power parameter.

13. The system of claim 9, wherein: the at least one processor is configured to identify the power grid fluctuation based at least in part on a determination that a value of at least one of the one or more parameters fails to satisfy at least one threshold value, and the at least one processor is further configured to direct operation of the at least one power source in order to maintain power grid stability.

14. The system of claim 9, wherein the at least one processor is further configured to direct, based at least in part on the identification of the power grid fluctuation, adjustment of an amount of power supplied to at least one electrical load associated with the structure.

15. The system of claim 9, wherein: the at least one communications interface is further configured to communicate with a control device associated with another structure; and the at least one processor is further configured to (i) identify, based at least in part upon the communication with the control device, one or more additional power sources associated with the other structure, and (ii) direct, based at least in part on the identification of the power grid fluctuation, operation of at least one of the one or more additional power sources.

16. The system of claim 9, wherein: the at least one communications interface is further configured to communicate with a control device associated with another structure; and the at least one processor is further configured to (i) determine, based at least in part upon communication with the control device, a power supply capability and a power demand associated with a plurality of structures comprising the structure and the other structure, and (ii) direct, based upon the determined power supply capability and the determined power demand, operation of at least one of (a) the at least one power source, (b) one or more additional power sources associated with the other structure, (c) one or more electrical loads associated with the structure, or (d) one or more electrical loads associated with the other structure.

* * * * *

UNITED STATES PATENT AND TRADEMARK OFFICE
CERTIFICATE OF CORRECTION

PATENT NO.         : 8,831,788 B2                                    Page 1 of 1
APPLICATION NO.    : 13/090657
DATED              : September 9, 2014
INVENTOR(S)        : Flynn et al.

It is certified that error appears in the above-identified patent and that said Letters Patent is hereby corrected as shown below:

In the Specification

In Column 7, Line 65, delete "local, power" and insert -- local power --, therefor.

In the Claims

In Column 19, Line 23, in Claim 9, delete "sale" and insert -- a sale --, therefor.

Signed and Sealed this
Twelfth Day of May, 2015

Michelle K. Lee
*Director of the United States Patent and Trademark Office*